May 20, 1930.  E. R. HOBBS  1,759,400
EAR TAGGING APPARATUS FOR STOCK
Filed Feb. 9, 1928
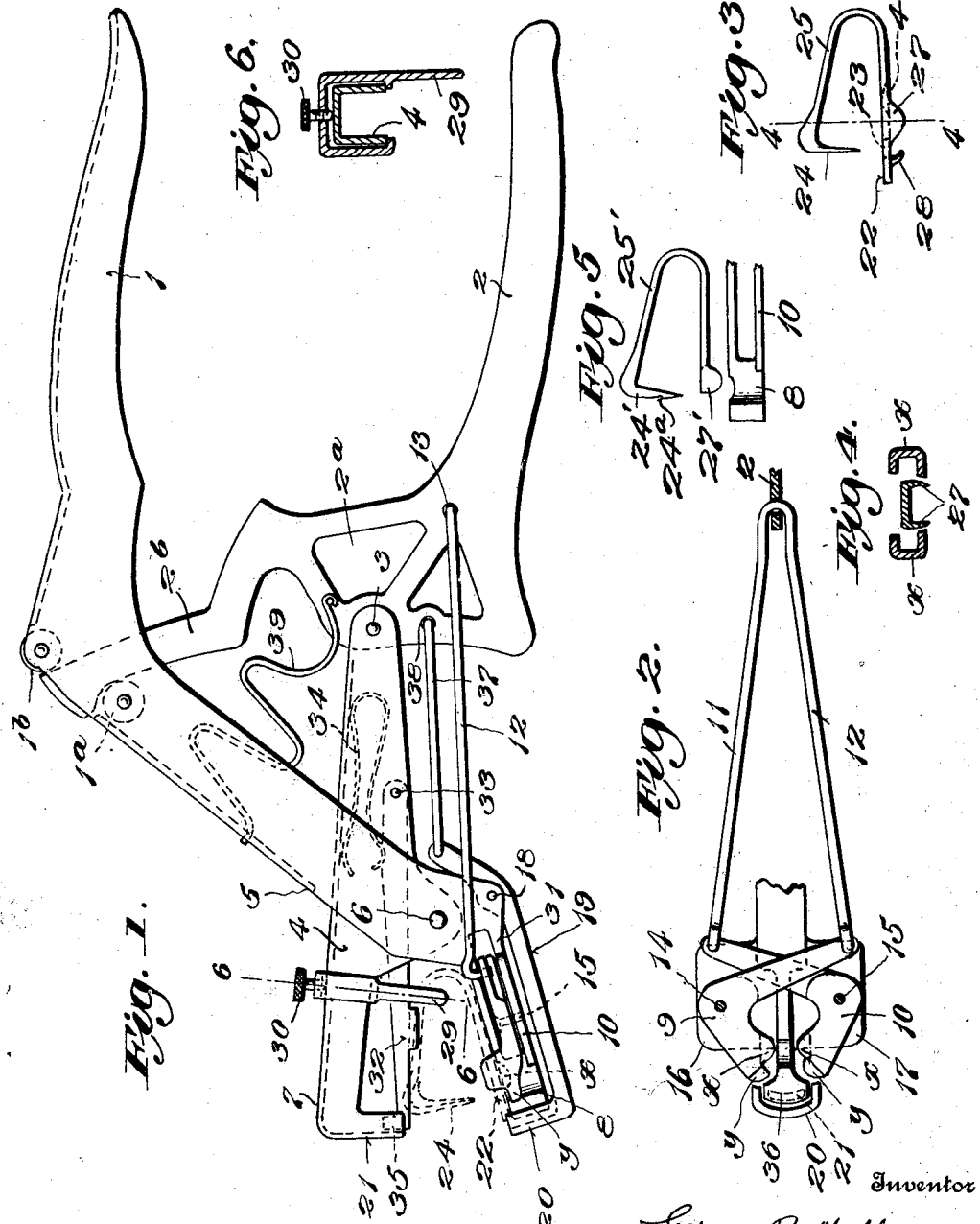
Inventor
Elbert R. Hobbs,
By Edward E. Clement
Attorney Patented May 20, 1930

1,759,400

UNITED STATES PATENT OFFICE

ELBERT R. HOBBS, OF CASTLEFORD, IDAHO

EAR-TAGGING APPARATUS FOR STOCK

Application filed February 9, 1928. Serial No. 253,090.

My invention relates to methods of and apparatus for marking stock and has for its object the production of a novel ear tag and pliers for inserting the same, which will be free from certain objections raised against those previously used and which will attain certain results not heretofore possible.

Heretofore, in using tags to mark stock, they have been applied to the ears, but without special provision for safety or cleanliness, so that the tags often make the ears sore, and sometimes cause them to fester so that the tags come out. Further objections are as follows: (1) The tag being made of bent metal, the clinch on the bent tag often straightens out and the tag spreads and is lost; (2) because of the heavy pressure required to insert the tag it is often only partially clinched and consequently lost; (3) the plain tag is often inserted too far into the ear, leaving insufficient room for the ear to grow; (4) the ordinary plain tag can be removed and reinserted without marring it, thus allowing unscrupulous persons to alter the marking of their stock fraudulently; (5) after a tag is inserted and the puncture heals, it is possible for wool and dirt to collect beneath the tag causing a sore; (6) the spring in the tag being depended upon to keep the same in the pliers before insertion, and the tags being usually made of aluminum, which has very little resilience, improperly shaped tags fall out; (7) a jar or blow will shake the tag out of the pliers; (8) points of the tags sometimes bend while being inserted; and (9) sometimes the point of the tag is bent upward and strikes the base, thus ruining the tag.

I overcome these and other objections, 1st, by punching a hole in the ear separately but at the same time that the tag is inserted; 2nd, I make use of special flanges stamped from the base of the tag, which are thin, and these flanges are pressed down upon the points after they are clinched; 3rd, I provide an adjustable stop on the pliers to prevent the tag from being inserted too far into the ear; 4th, I provide special flanges and a special lip, which are clinched so as to make it impossible for anyone to remove an aluminum tag of this description without marring the same, and probably breaking it off, as aluminum will not endure much bending; 5th, I round the tag on the inside, which strengthens the tag, as well as rounding it where the wool and dirt would otherwise collect; 6th, I provide a flexible member on the pliers to hold the tag in position before insertion; (by this means the tag is held in position regardless of the spread of the tag which often varies); 7th, I provide side projections to hold the tag in place; 8th, I provide means in the body of the cutter, to bear against the end of the tag and prevent bending; and 9th, I provide a guide for the point in the body of the punch, so that it cannot strike the base; this also prevents the tag from bending out of shape.

The foregoing and other advantages and features of improvement will be apparent from the detailed description hereinafter, and the accompanying drawings forming a part of this specification, in which, Fig. 1 is a side view of a pair of pliers specially adapted to carry out my invention.

Fig. 2 is a detailed view of the side clinching jaws, detached from the pliers.

Fig. 3 is a side view of my improved tag with a part of the base in section.

Fig. 4 is a section on the line 4—4 of Fig. 3 showing the jaws of the side clincher in Fig. 2, as they engage the side projections on the tag, shown in Fig. 3.

Fig. 5 is a side view of a modification showing a portion of the lower jaw 10 and the tag having a base, an upper arm and a point extending past the end of the base.

Fig. 6 is a cross-section on the line 6—6 of Fig. 1, showing the gauge.

In the drawings, 1 and 2 are a pair of handle levers, which instead of being directly pivoted together as in the ordinary pliers commonly used are indirectly pivoted together to obtain a certain combination of movements which will be hereinafter described. Lever 2 has an extension $2^a$ and guide member $2^b$ extended between friction rollers $1^a$—$1^b$ in a slot in the lever 1. The outside of the extension $2^a$ carries the pivot 3 for a supplemental lever 4 which extends through the extension 5 of the lever 1, to which it is pivoted at 6. As a result of this arrangement the forward part of levers 1 and 2 operate independently of the ends of same and can be moved together by compressing the handles 1—2 with the forefingers, and at the same time the ends of the handles 1—2 will remain practically stationary as regards each other. During this movement the extension guide $2^b$ rides up between rollers $1^a$—$1^b$ but the pull rods 11—12—37 are not materially affected. After the jaws 7—8 have been fully closed then the ends of the handles 1—2 are compressed towards each other, and the extension guide $2^b$ rides further in between rollers $1^a$—$1^b$ though in another direction, and this movement does not alter the position of the jaws 7—8 but does exert a pull upon the rods 11—12—37. This pull upon the rods 11—12 serves to operate bell crank levers which are integral with the two jaws 9—10, said bell crank levers extending through an opening in the lower jaw 8 and are pivoted at 14 and 15 respectively, and during this movement the handle 2 turns upon pivot 3, and the pull rods 11—12—37 turn at their point of contact at 13 and 38.

Below the jaw 8 and pivoted at 18 to the main lever 5 is a supplemental jaw or clearing piece 19, the tip 20 of which cooperates with lower jaw 8 in holding the tag, and also cooperates later with the tip of 21 in punching the ear. The position of the tag in the pliers is shown in dotted lines in Fig. 1, and the form of the tag is shown in detail in Figs. 3 and 4. The base 22 has an opening 23 to receive the point 24 which is an extension of the upper part of the body 25, and the tag at the bend and also for a short distance from the bend in both directions is corrugated, with the convex surface on the inside of the tag and the trough on the outside, the reason for this rounding being to increase the strength of the tag, and to prevent dirt and foreign matter from accumulating under the tag and causing irritation. The base of the tag, 22, is provided with an opening 23, and just to the rear of this opening two side lips 27 are formed which are preferably formed with the edges thin as shown, and adapted to be bent together and up against the point 24 after it is clinched. In front of the opening is a dependent lip 28, also tapered off to thinness at the point, and adapted to be bent up against the point 24 after it is clinched.

The side lips 27 are shown in Fig. 4, and the side jaws $x$ are also shown. As indicated in Fig. 2, these side jaws are formed upon the inside faces of the main jaws 9—10, and when the afore-mentioned pull is exerted on the rods 11—12, by the lever 2, these side jaws are forced together on the opposite sides of the base 22 of the tag, so as to bend the lips 27 toward each other, causing them to overlap upon the point of the tag 24, as it extends downward through the opening 23 and is bent over to the rear in a semicircular shape, and up into the depression or pocket 44 that is formed substantially in the base of the tag by stamping a pocket almost but not quite through the metal, the inner surface of the base being left smooth. This pocket protects the end of the tag, and assists in making a stronger clinch.

In addition to the jaws $x$, a pair of small protruding lugs $y$ are provided upon the tips of the main jaws 9—10 and when the latter are forced together as previously described, these lugs $y$ press obliquely back upon the dependent lip 28 (see Fig. 3) and bend the lip also to the rear and up against the point of the tag after it is clinched. The clinching of the lips 27 and also the lip 28, in turn flattens the point 24 and presses it up against the under side of the base, and the result of this is that the bend in the point where it emerges from the opening 23, is more acute, and the point is less liable to be pulled out under stress.

Positioned partly within lever 4 and jaw 7 is a supplemental lever 32, which is normally held in position by spring 34, and serves to secure the tag in position in the pliers. When the jaws 7—8 are being closed the lever 32 remains stationary for awhile as jaw 7 closes down upon it, and later moves in unison with it and thereby forces the point of the tag 24 through the ear which is followed by the die or cutter 21, which being forced down upon base of tag 22 punches a piece out of the ear, said piece being severed partly by the point of the tag, and partly by die 21.

The clinching of the point 24 is controlled partly by the dependent lip 28, and partly by a curved depression 40 in the jaw 8, the two working in unison to bend the point around in a semi-circular shape. And when the lips 27 are being clinched up against the point 24, the base of tag is prevented from being forced out of position by the two upper jaws of $x$ as shown in Fig. 4, these upper jaws closing in above the base of tag 22, and holding it securely down to its place.

At the same time the jaws 9—10 are being closed, the supplementary jaw 19 is also raised at its outer end by the pull rod 37, and the outer end of said jaw (20) in raising up the ear from the base 22, and assists in severing any part of the ear that might be still clinging, thus insuring a clean aperture in the ear. When the pressure on handles 1—2 is released, the spring 39 or the equivalent thereof forces the handles apart, and the different parts return to their normal position, and in doing so the jaw 7 moves away from the supplementary lever 32. On the extreme end of 32 is a lug 35 that serves to push out of the die 21 the piece that has been punched out of the ear, thus cleaning the die.

In order to allow the jaws $x$ and lugs $y$ to clinch the lips 27—28 the lower jaws 8 is cut away to a narrow width at that point so that it will not interfere with said jaws. Also inserting the point into the ear, the body of die 21 bears against the outer surface of point 24, and prevents the point from striking the outer edge of opening 23, which might happen in case the point were bent out of shape. And the body of die 21 also prevents the point of the tag from bending while inserting which might happen with a heavy thick ear, or if the animal should give a sudden jerk.

In order to prevent the tag from being inserted too far from the edge of the ear, an adjustable gauge 29 is provided that can be moved back and forth upon jaw 7 to suit the animal being tagged, and is secured in position by thumb screw 30. This gauge insures the tag being inserted an even depth into the ear, and with young animals overcomes the common fault of inserting the tag too far, so that it crowds the growing ear, and causes irritation and often loss of tags.

I wish to call attention to the fact that while I have described the tag as having an opening 23 in its base, that the tag will operate perfectly without said opening, the end of the base beyond said opening being removed. In that case the die 21 would need to be longer, and to bear against the lower jaw 8 in punching the ear, but otherwise the tag would be identical as well as the plier for inserting same. Transverse recesses 45 in the point 24 could be formed in which the lips 27 would be clinched, thus effectively preventing the point from being pulled out after being clinched, as would also the point which would be clinched in pocket 44. This I consider constitutes a valuable variation, and I will claim same as a part of my invention.

The plan of using supplemental means such as lever 19 to raise the material to be punched away from the base to complete the severing of the material would be useful in other apparatus than tagging pliers, and I shall claim the same broadly.

The design of plier which embodies a novel mechanical movement of the handles is not limited to tagging pliers, but is useful for other purposes and I will claim the same broadly.

With this description it is thought the operation of my improved method and apparatus may be understood. With the pliers in the position shown in Fig. 1, and the tag in the dotted line position therein, the animal's ear is placed between the parts 20—21, which are forced together by pressure of the fingers on the forward part of handles 1—2, which movement pierces the ear with point 24 and also cuts out a piece by means of die 21, and the same movement of the jaws causes the point 25 to enter the opening in base 23 and also to be clinched in semicircular shape, the said point in its final movement being forced up into a depression or pocket 44 that is formed in the base of the tag, a short distance to the rear of aperture 23. The ends of the handles are then closed which operates pull rods 11—12—37 which in turn operate jaw 9—10 with their projections $x$ and $y$, and which clinch the lips 27—28 up against the clinched point 24, and also flatten it against the lower side of the base. And during the latter movement of handles 1—2 the supplementary jaw 19 is raised up against the ear, and strips it away from the die, thus severing any part of the ear that might be still clinging. And when the pressure on the handles is released the parts return to normal position, and the lug 35 cleans the punched portion of the ear from out the die.

While I have described this tag and means for inserting same in connection with marking livestock, I would call attention to the fact that the same can be used for marking other things with very satisfactory results, and without any necessary changes in my design. It will be apparent without further description that the apparatus, including the tag and pliers and the method of using the same, overcome all the objections which I have stated in the beginning of this specification. I am aware that there may be many changes and modifications made in more than one of the elements and features I have described; but it is to be understood that all changes and modifications are within the scope and purview of this invention, and are contemplated by me as within the scope of the appended claims.

Fig. 5 shows a modification of the tag, with the end of the base omitted beyond the lip 27'. The point 24' has a notch in it at 24$^a$ to render it easier to turn the point when it strikes the curved depression in the base 8. The upper member 25' is straight, as in Fig. 3. The base may have a notch to receive the point 44.

Fig. 6 is a detail sectional view showing the manner of securing the limiting stop 29 on the lever 4, by means of a set screw 30 or equivalent device.

What I claim is:

1. In apparatus of the class described, a pair of levers, a pair of jaws adapted to be moved thereby, means for holding between said jaws a metal device to be clinched, and punching means with supplemental operating means therefor, whereby the same dies may first prepare the orifice and thereafter may be actuated by said levers to clinch the metal device therein.

2. A tag of the V-shape type, means for inserting same, and an adjustable gauge stop to control the distance said tag shall be inserted from the edge of subject being marked.

3. In apparatus of the class described, a pair of pliers, a pair of combination cutting and clinching jaws therefor, means to hold a metal tag therein, a separate cutter thereon cooperating with the tag, and means to operate the same so as to produce a puncture partially by the point of the tag and partially by said separate cutter.

4. In apparatus of the class described, a pair of pliers, a pair of compression jaws therefor, a pointed tag adapted to be held in said jaws, a cutter also held in said jaws, and means for operating the point of the tag and said cutter in conjunction to first produce an orifice, and then to clinch the tag therein.

5. The apparatus claimed in claim 4 having a limiting stop carried on the jaws, to permit penetration by the tag to a predetermined distance only.

6. The apparatus claimed in claim 4, having means carried on one jaw for normally holding the tag in position between the jaws.

7. The apparatus claimed in claim 4, having means carried on one jaw for normally holding the tag in position between the jaws, together with means for clearing the cutter from the piece cut out of the orifice penetrated by the tag.

8. In apparatus of the class described, a pair of pliers, having handle levers, jaws worked thereby, means for holding, inserting and clinching a tag, a cutter adapted to act in conjunction with the tag to produce an orifice, and a supplemental cutting or lifting member, adapted to rise when the handle levers are forced together, and to sever any part that may be still clinging.

9. In apparatus of the class described, a punch, a base plate for holding the material to be punched, and a supplemental lifting member lying around said base plate and conformed in shape approximately to the shape of said punch, together with means for forcing down the punch from the base plate and means for lifting said supplemental member to complete the severance of the material.

10. In apparatus of the class described, a pair of pliers having means for holding, inserting and clinching in the ears of stock, of tags carrying clincher points and integral lips adapted to be clinched thereover, said pliers being provided with lateral pivoted supplemental jaws for compressing and clinching over said integral lips.

11. A pair of pliers for use in attaching metal tags to the ears of stock comprising the following instrumentalities: a pair of handle levers 1—2, a supplemental lever 4, connecting said handle levers, means normally maintaining said levers in retracted position with respect to each other, a pair of jaws one, 7, formed on the supplemental lever 4 and the other, 31, on an extension 5 on the main lever 1, a supplemental jaw 19 pivoted on the main jaw 31 and a pair of lateral jaws 9—10 also pivoted on said jaw 31, with pull rods 11—12—37 therefor extending to bearings on the lever 2.

12. A pair of pliers as claimed in claim 11, having a rigid member $2^b$ extending from one lever 2 through guiding means such as $1^a$—$1^b$ on the other lever 1, and means such as 39 for normally maintaining said levers in retracted position.

In testimony whereof I hereunto affix my signature.

ELBERT R. HOBBS.